United States Patent Office 3,849,532
Patented Nov. 19, 1974

3,849,532
METHOD OF PREPARING A ZIRCONIUM OXIDE THAT IS CRYSTALLIZED MOSTLY OR COMPLETELY IN CUBIC FORM
Klaus Deneke, Troisdorf-Lulsdorf, and Wilhelm Falkenhain and Peter Hack, Troisdorf-Ranzel, Germany, assignors to Dynamit Nobel Aktiengesellschaft, Troisdorf, Germany
No Drawing. Continuation of abandoned application Ser. No. 16,968, Mar. 6, 1970. This application Jan. 31, 1972, Ser. No. 222,405
Int. Cl. C01g 25/02
U.S. Cl. 423—82                    9 Claims

ABSTRACT OF THE DISCLOSURE

Improvements in preparing cubic zirconium oxide by separating mixed zirconia and silica by floatation, granulating the recovered zirconia, treating such with hydrofluoric acid solution, mixing this product with calcium oxide or the like and then heating such mixture to about 1000 to 2000° C. in order to convert the monoclinic crystal structure of the zirconia to a cubic crystal structure in the solid state.

---

This is a continuation of application Ser. No. 16,968 filed Mar. 6, 1970, now abandoned.

It is in the prior art to prepare so-called stabilized zirconium oxide, i.e. zirconium oxide which is completely or substantially complete in cubic crystal form, by melting suitable zirconium containing ores, such as zirconium sand, Baddeleyite or zircite, in an electric arc furnace with the required amount of carbon together with calcium oxide and/or magnesium oxide as stabilizing oxides. This process reduces the undesired oxides that accompany the zirconium ores, usually $SiO_2$, $Fe_2O_3$ and $TiO_2$, to metal. The high content of $SiO_2$ requires very large amounts of electric power for this reduction and therefore there is an economic detriment.

Furthermore, the reduced metal alloy content is adjusted with the addition of metallic iron, usually in the form of iron chips. The specific gravity of the alloy is thereby increased, making it possible for the alloy to sink into the bottom part of the melt. The magnetic properties of the alloy are improved by the addition of this iron, making it practical to remove the product of the following refining process by magnetic separation.

This entire known process, however, is hard to control. The reduction of the ores which have a zirconium oxide content of 65 to 80% and a maximum permissible $SiO_2$ content of 0.5% for stabilized zirconium oxide is difficult. The reduced alloy must be removable entirely from the product. The crushed material so produced must be oxidized at a temperature of at least 1300° C. In spite of all the difficulties and expense, however, it is still very difficult to achieve a uniform end product that is the very delicate stabilized zirconium oxide (see American Pat. 2,535,526) of suitable quality.

According to another known process, zirconium ores are mixed with basically reacting oxides, which have to be in a certain predetermined ratio to acidly reacting oxides, and the mixture is fused at about 1800° C. The fused material is then crushed and finely ground, and then mechanically separated into a coarser part consisting substantially of zirconium oxide and a finer part consisting of silicates. The coarser portion is then treated with hydrochloric acid to destroy the silicate content, and then treated with caustic soda solution to dissolve the silica gel that has been formed, the product is then again screened, washed and dried.

This known process is also complicated and expensive, and difficult to control. Since its inception, it has been modified to use a mixture of zirconium ores and dolomite, and eventually fluorspar too, with the temperatures used ranging between 1350 and 1450° C. The rest of the procedure has remained as set forth above, i.e., the partially fused mass is finely comminuted, and a thin slurry thereof is prepared with water; then, in two washing processes using hydrochloric acid and soda lye, the cubic zirconium oxide crystals are won from the slurry; cf. American Pats. 2,578,748 and 2,721,115.

An attempt has also been made to substantially remove the silica with hydrofluoric acid, but the procedure starts out directly from fused zirconium ore, and requires a great quantity of relatively highly concentrated acid. This last above referred to process is not intent upon preparing stabilized zirconium oxide; cf. German Pat. 647,918.

Stabilized zirconium oxide is constantly growing in importance and usage, the properties of such material have become more stringently prescribed. While it may be desirable to use completely stabilized zirconium oxide, it is often possible to use mixtures of monoclinic and cubic zirconium oxide even though these mixtures are much less sensitive to thermal shock than the 100% cubic structure. Most frequently, cubic zirconium oxide stabilized with CaO is required. Increasingly, however, the cubic structure stabilized with other oxides is demanded. These requirements make it necessary to prepare product in batches that are chemically and physically very different, and small in size in some cases. These widely varying requirements cannot be commercially and economically met by the manufacturing processes known hitherto and set forth above.

According to the invention, the preparation of mainly or completely cubically crystallized zirconium oxide from monoclinic zirconium oxide, such as is obtained by flotational separation thereof from a mixture of $ZrO_2$ and $SiO_2$, is carried out by a process comprising treating the still moist or dried finely granular material with dilute hydrofluoric acid (suitably about 2 to 12% HF content) for 1 to 3 hours; separating it; intimately mixing the washed and dried material with 3 to 6 wt.-percent of finely granular calcium oxide or equimolar amounts of other finely granular polyvalent metal oxides which crystallize in cubic form only whose ion radius is of the same order of magnitude as that of the zirconium ion; and heating the mixtures thus obtained—in the form of molded pieces if desired—at temperatures between about 1000 and 2000° C., preferably between 1400 and 1900° C., until the desired degree of transformation of the cubic crystal form is achieved in a solid state reaction. This heating is for about 2 to 30 hours.

The oxides, for example of calcium, magnesium, ytrium, thorium, cerium, or mixtures of such oxides, can be used as the oxides in the process; instead of these metal oxides, other metal compounds can be used which yield the desired metal oxides by decomposition during the process. Examples of these other compounds are the hydroxides, carbonates, bicarbonates, oxalates, acetates, or the like.

The process of the invention thus consists of a plurality of entirely separate and easily controlled individual steps.

The first step utilizes the process of W. German Green Pat. DAS 1,118,178. In this process zirconium sand is fused in an arc furnace to decompose the molten material to zirconium oxide and $SiO_2$. The fused material is ground to a fine state of subdivision and then the two phases thus formed are separated by a flotation process. A monoclinic zirconium oxide is obtained having a residual content of about 0.65% $SiO_2$.

The second step of this process further refines this intermediate monoclinic zirconium oxide product to a residual content of about 0.2% $SiO_2$. This second step is performed with the use of hydrofluoric acid at room temperature. A relatively brief treatment of about 1 to 3 hours with a 5 to 10% aqueous hydrofluoric acid solution is surprisingly entirely sufficient. More than 75% of the dilute acid product is recovered and recycled back into the process. The purified zirconium oxide is decanted and dried.

In a third step of the process, the material produced by the second step is then transformed substantially or completely from the monoclinic to the cubic modification. This is not done, however, in a molten bath as has been the practice hitherto, but in a solid reaction.

Very large amounts of stabilized zirconium oxide are needed in particulate form having a high degree of fineness, usually up to about 70 millimicrons. Grinding material which has already been fused and stabilized to this fineness, however, usually causes considerable contamination by the grinding tools or by the silica content. According to the process that is the subject of this invention, the material produced by the first and second steps of the procedure, that is monoclinic form zirconium oxide of high purity and sufficient fineness is mixed with the oxides required for stabilization—e.g., CaO— and is then transformed partially or completely to the cubic form at temperatures at which no more than a slight sintering occurs, e.g. about 1000 to 2000° C., so that at most only a light crushing of the reacted product may be desired or required.

If coarser material is required, the floated, fine grained monoclinic zirconium oxide, which has been treated with hydrofluoric acid and mixed with the necessary percentage of stabilizing oxides, is formed, by light pressure, into suitably sized shaped articles, using an organic binder that is volatile at low temperatures. If these bodies are heated for several hours at temperatures of, for example, 1850° C., sintering occurs. These bodies are then ground to obtain the desired coarser grits which have a compressive strength that makes them suitable for their intended use.

The following Examples are illustrative of this invention.

EXAMPLE 1

150 kg. of a monoclinic zirconium oxide, purified according to DAS 1,118,178 down to 0.65% $SiO_2$, is mixed with 150 liters of 8% hydrofluoric acid. This mixture is placed in a plastic tank that is resistant to hydrofluoric acid, and slowly agitated at room temperature for about 2 hours. Then the hydrofluoric acid is poured off; it can be reused. The resultant zirconium oxide is purified by repeated washing with salt-free water and decanting whereupon it is dried. The $SiO_2$ content of the material thus treated has been reduced to 0.19%. This product is a fine grained powder having a size up to about 40 millimicrons.

200 kg. of the monoclinic zirconium oxide, purified down to 0.19% $SiO_2$, are mixed with 9.2 kg. of burnt lime of high fineness. Ethanol is added to the mixture as a binding agent, and then, under light pressure, pieces are formed measuring about 100 x 200 x 30 mm. These pieces are then fired in a tunnel furnace with the temperature therein raised to 1790° C., from room temperature over a period of about 24 hours. The firing time at this maximum temperature was about 6 hours, and the pieces leave the furnace at about 80° C. The resultant product is hard-sintered pieces which are broken up, ground and then screened. The grinding resulted in a product having the following grain sizes in substantially equal parts:

0–0.12 mm.      0.25–0.50 mm.
0.12–0.25 mm.   0.50–1 mm.

These particles are sufficiently strong so that they can be molded into shaped articles. X-ray examination shows that over 90% of the grains have been transformed by the heat treatment from the monoclinic to the cubic crystal structure.

Test specimens of 10 x 10 mm. cross section and 50 mm. length were pressed from these particles with the use of 5% wax binder. These specimens were heated to 1200° C. in a dilatometer. The measurements show, as reflected in the following table, that the thermal expansion of the product is completely uniform, returning to 0 after the cooling thereof.

|  | Percent expansion |
|---|---|
| 20° C. | 0 |
| 200° C. | 0.17 |
| 400° C. | 0.36 |
| 600° C. | 0.58 |
| 800° C. | 0.81 |
| 1000° C. | 1.04 |
| 1200° C. | 1.26 |
| 20° C. | 0 |

Chemical analysis of the test showed, in addition to $ZrO_2$, the following values:

|  | Percent |
|---|---|
| $Al_2O_3$ | 0.26 |
| $Fe_2O_3$ | 0.041 |
| MgO | 0.06 |
| $TiO_2$ | 0.062 |
| CaO | 4.30 |
| $SiO_2$ | 0.21 |

EXAMPLE 2

In each case, 5 kg. of monoclinic, refined zirconium oxide having a grain size of up to 70 millimicrons, were mixed with fine lime dust as in Example 1. A section of pipe with a diameter of 120 mm. was filled with the mixture and heated in a gas-fired furnace. The firing temperatures, firing time and contents of cubic zirconium oxide were:

Specimen 1:
    1500° C.
    4 hours
    61% cubic material

Specimen 2:
    1400° C.
    24 hours
    92% cubic material.

The dilatometer measurements performed on all specimens produced the expected thermal expansion curve similar to that shown in Example 1 above.

In spite of the high percentage of cubic zirconium oxide in Specimen 1, it still clearly shows the influence of the monoclinic modification, i.e., in the 1000 to 1100° C. temperature range it still shows a phase transformation to the tetragonal structure, with a corresponding contraction in volume, depending on the percentage of monoclinic zirconium oxide.

Specimen 2 has a more uniform, practically linear expansion curve.

After the heat treatment set forth hereinabove the product is only slightly sintered together. By light crushing the product can again be reduced to a fineness of up to about 70 millimicrons.

What is claimed is:

1. A process for converting monoclinic zirconium oxide to cubic zirconium oxide, which monoclinic zirconium oxide has been obtained by the flotation separation of a zirconium oxide-silicon oxide mixture, including finely granulating the zirconium oxide recovered from said flotation separation; treating said granulate with dilute hydrofluoric acid solution having a concentration of between 5 and 10%; separating the so-treated granulate from said solution, mixing said granulate with at least one oxide of a metal selected from the group consisting of calcium, magnesium, yttrium, thorium and cerium; and heating such mixture to about 1,000 to 2,000° C., whereby converting said monoclinic crystal structure substantially to a cubic crystal structure in the solid state.

2. The process claimed in claim 1 wherein said heating is from about 1400 to 1900° C.

3. The process claimed in claim 1 wherein said metal oxide is one which crystallizes in a cubic structure.

4. The process claimed in claim 1 wherein said admixture is molded into a shaped article prior to said heating.

5. The process claimed in claim 1 wherein said hydrofluoric acid treating is for about 1 to 3 hours.

6. The process claimed in claim 1 wherein said metal oxide is present in a proportion of about 3 to 6 weight percent based upon the weight of the zirconium oxide.

7. The process claimed in claim 1 wherein said metal oxide is calcium oxide.

8. The process claimed in claim 1 wherein said heating is for about 4 to 24 hours.

9. A process according to claim 1 wherein the monoclinic zirconium oxide before treatment with the hydrofluoric acid has a residual content not greater than 0.65% silica.

References Cited

UNITED STATES PATENTS

| 1,796,170 | 3/1931  | Terwilliger    | 423—75 |
| 2,578,748 | 12/1951 | Schoenlaub     | 423—82 |
| 2,076,080 | 4/1937  | George et al.  | 423—75 |
| 3,514,252 | 5/1970  | Levy et al.    |        |
| 2,996,369 | 8/1961  | Harris et al.  |        |
| 3,525,597 | 8/1970  | Mazdlyasni et al. |     |

FOREIGN PATENTS

| 1,118,178 | 11/1967 | Germany. |

HERBERT T. CARTER, Primary Examiner

U.S. Cl. X.R.

423—80, 69, 84

CERTIFICATE OF CORRECTION

Patent No. 3,849,532          Dated November 19, 1974

Inventor(s) Klaus Deneke, Wilhelm Falkenhain and Peter Hack

It is certified that error appears in the above-identified patent and that said Letters Patent are hereby corrected as shown below:

Column 1, line 10

The priority data is missing.

Insert -- Priority is claimed on the basis of Germany Application No. P 19 11 386.1 of March 6, 1969. --.

Signed and sealed this 21st day of January 1975.

(SEAL)
Attest:

McCOY M. GIBSON JR.
Attesting Officer

C. MARSHALL DANN
Commissioner of Patents